US008954365B2

(12) United States Patent
Criminisi et al.

(10) Patent No.: US 8,954,365 B2
(45) Date of Patent: Feb. 10, 2015

(54) DENSITY ESTIMATION AND/OR MANIFOLD LEARNING

(75) Inventors: Antonio Criminisi, Cambridge (GB); Jamie Daniel Joseph Shotton, Cambridge (GB); Ender Konukoglu, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 13/528,866

(22) Filed: Jun. 21, 2012

(65) Prior Publication Data
US 2013/0343619 A1 Dec. 26, 2013

(51) Int. Cl.
G06F 17/00 (2006.01)
G06K 9/62 (2006.01)

(52) U.S. Cl.
CPC .................................... *G06K 9/6232* (2013.01)
USPC .......................................................... 706/45

(58) Field of Classification Search
USPC .................................................... 706/12, 45
See application file for complete search history.

(56) References Cited

U.S. PATENT DOCUMENTS

| | | | |
|---|---|---|---|
| 5,930,392 | A | 7/1999 | Ho |
| 6,226,409 | B1 | 5/2001 | Cham et al. |
| 2010/0205123 | A1 | 8/2010 | Sculley et al. |
| 2010/0232686 | A1 | 9/2010 | Dewan et al. |
| 2011/0246409 | A1 | 10/2011 | Mitra |
| 2013/0166481 | A1 * | 6/2013 | Nowozin et al. ................ 706/12 |

OTHER PUBLICATIONS

Martinez, Dominique, "Neural Tree Density Estimation for Novelty Detection", In Proceedings of IEEE Transactions on Neural Networks, vol. 9, No. 2, Mar. 1998, pp. 330-338.
Yeung, et al., "Parzen-window Network Intrusion Detectors", In Proceedings of Sixteenth International Conference on Pattern Recognition, vol. 4, Sep. 2002, pp. 11-15.
Burkholder, Joshua Jeremy, "Nearest Neighbor Classification Using a Density Sensitive Distance Measurement", In thesis of Nearest Neighbor Classification using a Density Sensitive Distance Measurement, Sep. 2009, pp. 37-42.
Criminisi, et al., "Decision forests for classification, regression, density estimation, manifold learning and semi-supervised learning" MSR-TR-2011-114, Oct. 28, 2011.

(Continued)

*Primary Examiner* — David Vincent
(74) *Attorney, Agent, or Firm* — Miia Sula; Micky Minhas; Zete Law, P.L.L.C.

(57) ABSTRACT

Density estimation and/or manifold learning are described, for example, for computer vision, medical image analysis, text document clustering. In various embodiments a density forest is trained using unlabeled data to estimate the data distribution. In embodiments the density forest comprises a plurality of random decision trees each accumulating portions of the training data into clusters at their leaves. In embodiments probability distributions representing the clusters at each tree are aggregated to form a forest density which is an estimate of a probability density function from which the unlabeled data may be generated. A mapping engine may use the clusters at the leaves of the density forest to estimate a mapping function which maps the unlabeled data to a lower dimensional space whilst preserving relative distances or other relationships between the unlabeled data points. A sampling engine may use the density forest to randomly sample data from the forest density.

20 Claims, 12 Drawing Sheets

(56) References Cited

OTHER PUBLICATIONS

Criminisi, et al., "Decision Forests: A Unified Framework for Classification, Regression, Density Estimation, Manifold Learning and Semi-Supervised Learning". Foundations and Trends in Computer Graphics and Vision: vol. 7: No. 2-3, pp. 81-227, 2012.

Zheng, et al., "Fast Automatic Heart Chamber Segmentation from 3D CT Data Using Marginal Space Learning and Steerable Features", in Proc. Int'l Conf. Computer Vision, 2007.

Zheng, et al., "Four-Chamber Heart Modeling and Automatic Segmentation for 3D Cardiac CT Volumes Using Marginal Space Learning and Steerable Features", IEEE Trans. Medical Imaging, vol. 27, No. 11, pp. 1668-1681, 2008.

* cited by examiner

DENSITY ESTIMATION AND/OR MANIFOLD LEARNING

BACKGROUND

Density estimation and manifold learning are useful in many application domains including computer vision, medical image analysis, text document clustering, the analysis of general multi-dimensional data and others.

Density estimation involves calculating the volume of a probability distribution of a continuous variable where that volume is related to the probability that the variable will take a value in a specified range. For example, the variable may represent the location of a body joint of a person in 3D space. In another example, the variable may represent the probability that an image element depicts part of a body organ of one of a specified number of types. Many other examples are possible where it is required to learn a probability density function which provides a good estimate of some empirically observed data.

Manifold learning involves calculating a mapping for transforming data in a high dimensional space to a lower dimensional space whilst preserving similarity relationships between the data points. A similarity relationship may be for example, a geodesic relationship between data points which are image elements which is a distance which takes into account intensity or other gradients of the image. Other similarity relationships comprise distances or affinities such as Gaussian affinities, Euclidean distances, or other distances. Typically once the data is mapped into the lower dimensional space, computations may be performed in the lower dimensional space directly, in a more efficient manner than would otherwise have been possible.

The embodiments described below are not limited to implementations which solve any or all of the disadvantages of known systems for density estimation and/or manifold learning.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Density estimation and/or manifold learning are described, for example, for computer vision, medical image analysis, text document clustering and other applications. In various embodiments a density forest is trained using unlabeled data to estimate the data distribution. In embodiments the density forest comprises a plurality of random decision trees each accumulating portions of the training data into clusters at their leaves. In embodiments probability distributions representing the clusters at each tree are aggregated to form a forest density which is an estimate of a probability density function from which the unlabeled data may be generated. A mapping engine may use the clusters at the leaves of the density forest to estimate a mapping function which maps the unlabeled data to a lower dimensional space whilst preserving relative distances or other relationships between the unlabeled data points. A sampling engine may use the density forest to randomly sample data from the forest density.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
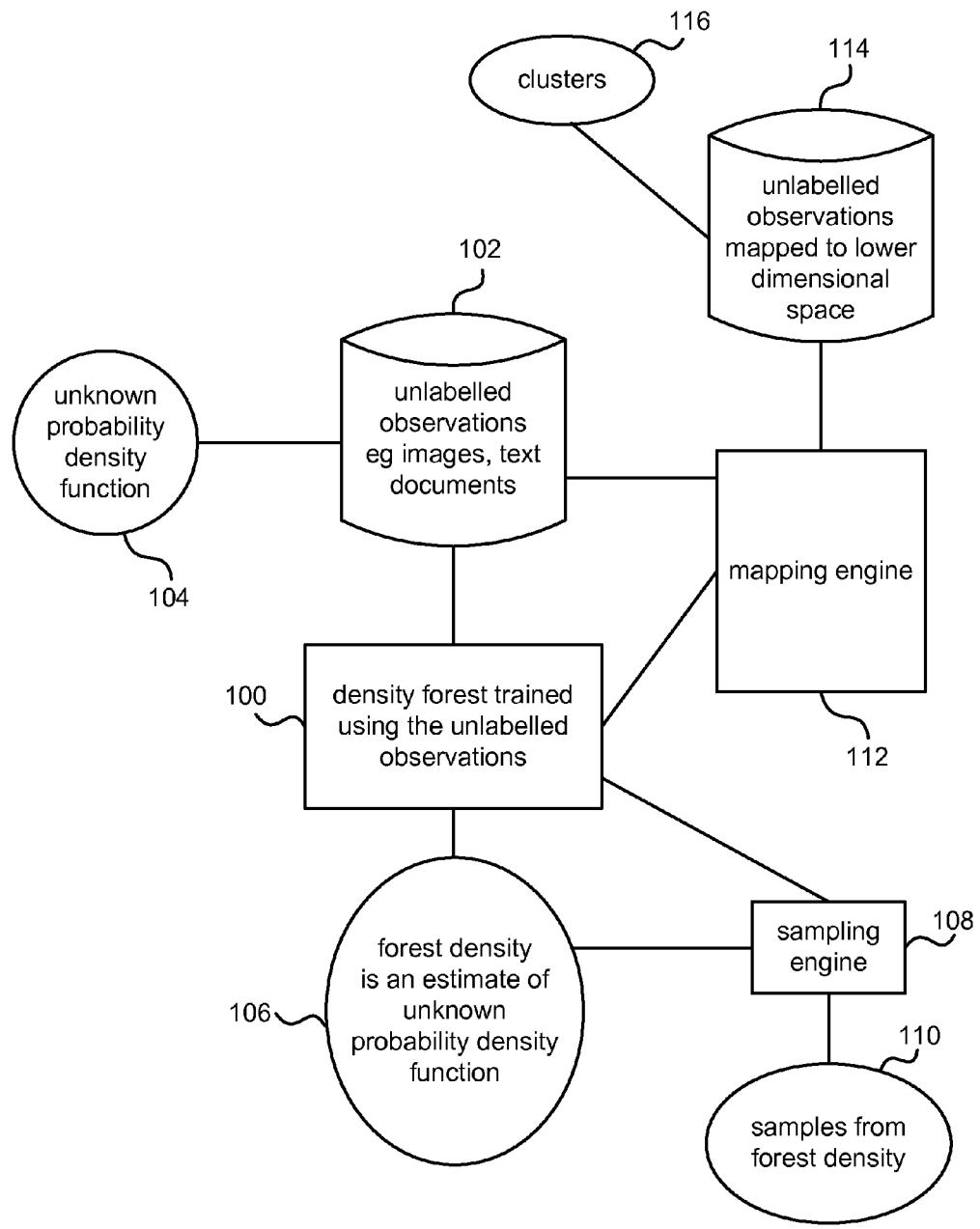
FIG. 1 is a schematic diagram of a density forest for describing unlabeled observations and of a mapping engine for mapping the unlabeled observations to a lower dimensional space using the density forest.

FIG. 1 is a schematic diagram of a density forest 100 for describing unlabeled observations 102 and of a mapping engine 112 for mapping the unlabeled observations to a lower dimensional space 114 using the density forest 100. The density forest is implemented using a computer as is the mapping engine. A density forest is a plurality of random decision trees each having a root node, a plurality of split nodes and a plurality of leaf nodes. The root nodes, leaf nodes and split nodes may be represented using data structures in memory and/or as computer implemented instructions. For example, instructions implementing the functionality of the density forest may be provided as software which may be compiled. Associated with each leaf node is data accumulated during a training phase when the density forest is trained with unlabeled observations 102. During training the structure of the trees is learnt (estimated). The data at the leaf nodes may be aggregated. For example, it may be represented using a probability distribution. Aggregating the probability distributions associated with leaves of each tree forms a forest density which is an estimate of the unknown probability density function 104. A probability density function is nonnegative everywhere, and its integral over the entire domain (of the continuous variable) is equal to one. A partition function may be computed in order to achieve this as part of the training process when the density forest is formed. Thus a probability distribution associated with each leaf of the trained forest may be domain bounded in that it is restricted within a specified range of values the variable may take. For example, the process of computing the partition function results in domain bounded probability distributions, one per leaf node.

Unlabeled observations 102 are stored at a database or are accessible from another source. The nature of the unlabeled observations depends on the application domain. For example, the unlabeled observations 102 may be digital images in the case of an image processing application. Digital images include two and higher dimensional images such as medical volumes, depth images, videos and other types of images. Other examples of unlabeled observations are, text documents, audio files, videos, sensor readings, or any other empirical data observed from an entity or environment which may be natural or automated. The observations are unlabeled in the sense that there is no ground truth data available for the observations. For example, in the case of landscapes it is not known what classes of landscape the individual images belong to (such as cityscape, seascape, country scene). In a medical image example it is not known what body organs are depicted in the individual medical images. The unlabeled observations 102 are assumed to be explained or modeled by an unknown probability density function 104. The density forest 100 seeks to estimate the unknown probability density function 104. This is achieved by training the density forest 100 using the unlabeled observations 102.

Data stored at a leaf of each tree in the forest may be combined to form a forest density 106. The data stored at each leaf may be used to calculate a domain bounded probability distribution so that the forest density sums to 1 (as a probability density function is non-negative and its integral over the range of values of the continuous variable is usually set to 1).

A sampling engine 108 which is computer implemented may be used to generate samples 110 from the forest density 106. This is achieved in an efficient and accurate manner by using the trained density forest 100. For example, in a medical image application domain, a forest density may describe the distribution of magnetic resonance (MR) images of the human brain. The forest can then be used to understand variations of brain anatomy within a population.

The unlabeled observations 102 may be in a two or higher dimensional space. For example, the unlabeled observations may be images of natural scenes. In order to map the unlabeled observations to a lower dimensional space 114 the density forest 100 may be used together with a mapping engine 112. The mapping to the lower dimensional space preserves local relationships such as geodesic distance or other relationships between the unlabeled observations prior to the mapping. For example, in the case of images, the mapping may preserve geodesic distances between image elements where geodesic distances are distances which take into account intensity of image elements or other image gradients. The unlabeled observations, once mapped to the lower dimensional space, may be processed more efficiently than otherwise possible before the mapping and may also be visualized and interpreted more easily. For example, clusters 116 may be identified in the unlabeled observations where those clusters exhibit natural affinities between the observations. Mapping high dimensional data to a lower dimensional one is also often useful for data visualization and interpretation.

The density forest provides a relatively simple and effective way of analyzing complex data such as images which gives accurate, useful results. By using an ensemble (plurality) of trees in the density forest the ability of the system to generalize is improved. Generalization is the ability to deal well with new examples which differ from training data. Also, an ensemble of trees enables robustness to be improved. The component trees in a density forest are randomly different from one another and this leads to de-correlation between individual tree predictions.

Alternatively, or in addition, the functionality described with reference to FIG. 1 may be performed, at least in part, by one or more hardware logic components. For example, and without limitation, illustrative types of hardware logic components that can be used include Field-programmable gate arrays (FPGAs), Program-specific Integrated Circuits (ASICs), Program-specific Standard Products (ASSPs), system-on-a-chip systems (SOCs), Complex Programmable Logic Devices (CPLDs), Graphics Processing Units (GPUs).

Figure 2:
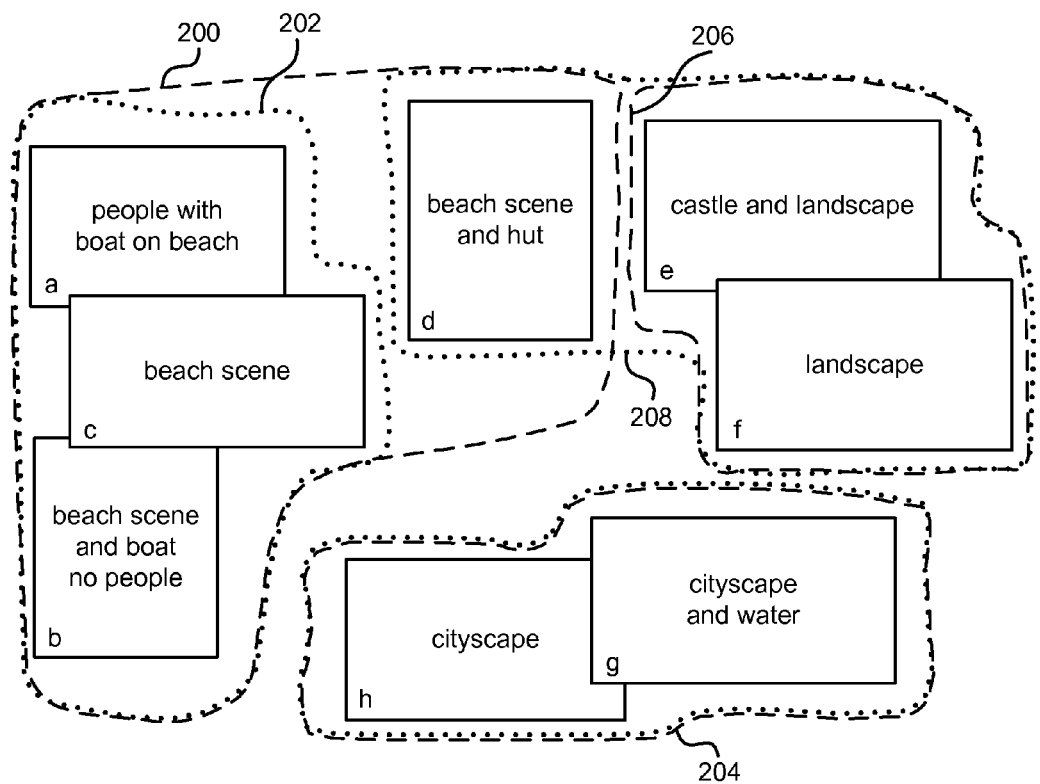
FIG. 2 is a schematic diagram of a photographs clustered using a density forest and mapping engine.

FIG. 2 is a schematic diagram of a plurality of digital photographs each represented as a rectangle containing words describing the content of the photograph. The system of FIG. 1 may be used to group the digital photographs into a plurality of clusters 200, 202, 204, 206, 208 as indicated by the dotted and dashed lines without the use of any labeled digital photographs. Different trees in the forest induce different image clusters corresponding to leaf nodes in the tree. For example a tree whose leaves are denoted by the dashed lines in FIG. 2 yields the partition {{a, b, c, d}, {e, f}, {g, h}}. A tree whose leaves are denoted by the dotted lines in FIG. 2 yields the partition {{a, b, c}, {d, e, f}, {g, h}}. The overlap between the clusters in the different trees is captured by the mapping engine 112

Figure 3:
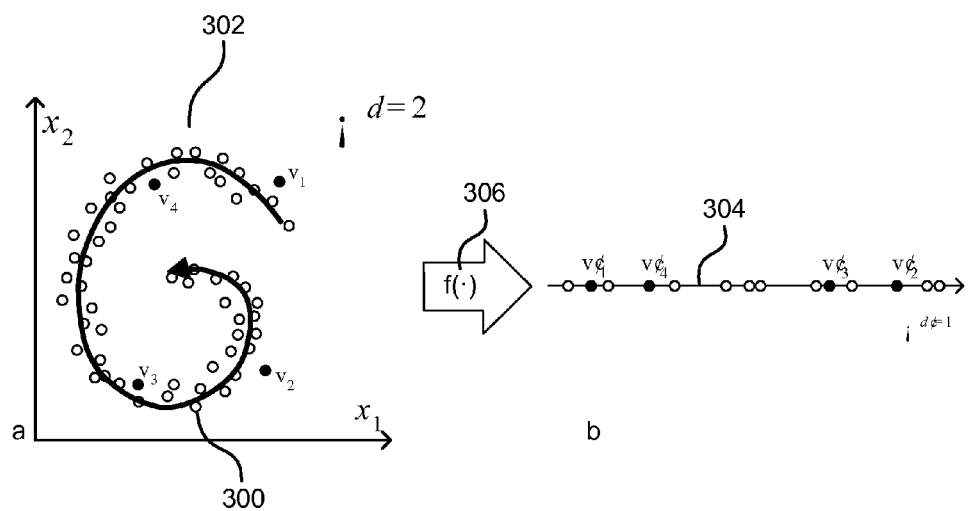
FIG. 3 is a schematic diagram of unlabeled input data mapped from a high dimensional to a lower dimensional space.

FIG. 3 is a schematic diagram of unlabeled input data mapped from a high dimensional to a lower dimensional space. Unlabeled data points are represented as circles 300 in a two dimensional space 302. Four unlabeled data points v1, v2, v3, v4 are shaded black for discussion. The mapping engine 112 may be arranged to use a mapping function 306 to map the unlabeled data points from the two dimensional space to a one dimensional space represented by line 304. The mapping engine preserves geodesic distances and ordering of the unlabeled data points. For example Euclidean distances on the line 304 are close to geodesic distances along the black curve in the two dimensional space 302. The density forest 100 may be used as described herein as part of a process to find the mapping function 306.

Figure 4:
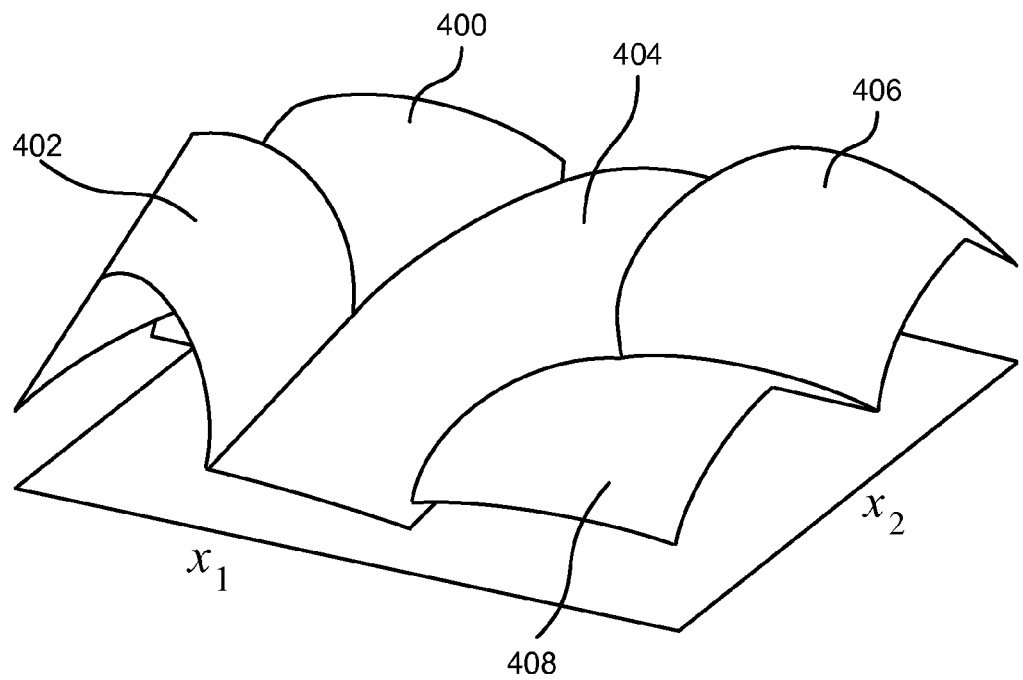
FIG. 4 is a schematic diagram of a tree density.

FIG. 4 is a schematic diagram of a tree density. As mentioned above, data stored at a leaf of each tree in the density forest 100 may be stored in the form of a probability distribution. The data stored at each leaf may be used to calculate a domain bounded probability distribution so that the tree density sums to 1(as a probability density function is non-negative and its integral over the range of values of the continuous variable is usually set to 1). FIG. 4 schematically represents a tree density having five domain bounded probability distributions 400, 402, 404, 406, 408 depicted as curved surfaces above a flat plane surface with sides x1 and x2. Each domain bounded probability distribution is associated with a leaf node, one leaf node from each of five leaves in a tree in this example. Other numbers of leaves may be used in a tree; five are shown in this example for clarity of description. The probability distributions are domain bounded in that each is restricted within a specified range of values variables x1 and x2 so that the specified area of x1, x2 is covered and so that the volume under the surfaces of the probability distributions is normalized to 1.

Figure 5:
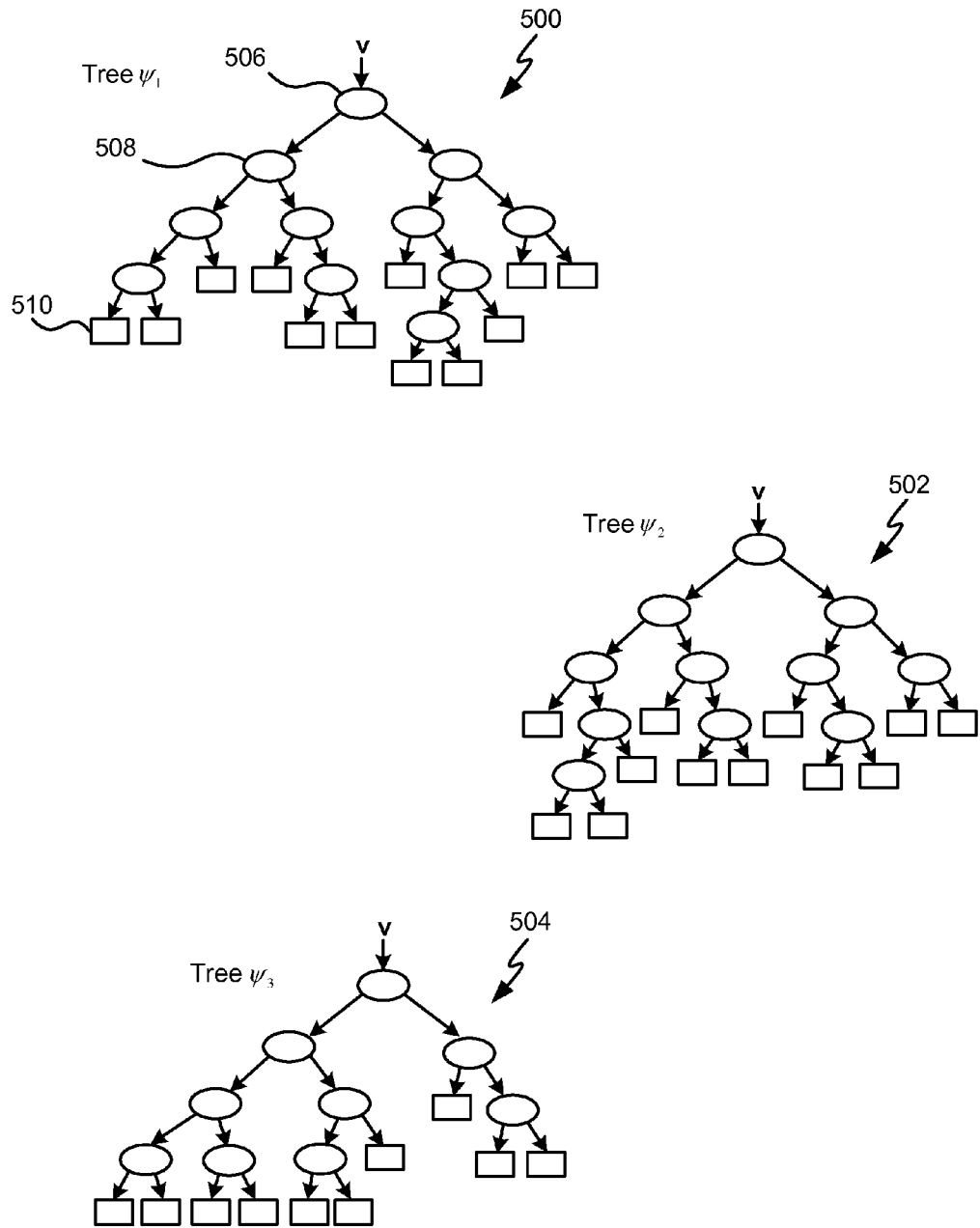
FIG. 5 is a schematic diagram of a random decision forest.

FIG. 5 is a schematic diagram of a random decision forest comprising three random decision trees 500, 502, 504. Two or more trees may be used; three are shown in this example for clarity. Each tree is a data structure comprising a plurality of nodes and edges organized in a hierarchical fashion. Nodes are divided into internal (or split) nodes and terminal (or leaf) nodes. In FIG. 5 the internal nodes and the root nodes are represented using ovals and the terminal nodes are represented using rectangles. All the nodes have one incoming edge and there are no loops. In the example in FIG. 5 the trees are binary in that each internal node has two outgoing edges. However, this is not essential, trees may be used where the internal nodes have one or more outgoing edge.

The trees 500, 502, 504 are decision trees in that each internal node has an associated test. For a given input object (such as part of an image or text document or other item) a decision tree estimates an unknown property of the object by asking successive questions (or making tests) about its known properties. Which question to ask next depends on the answer of the previous question and the training data set and this relationship is represented graphically as a path through the tree which the object follows. The decision is then made based on the terminal node on the path (which has associated stored data).

In the examples described herein random decision forests are trained using only unlabeled data. During training the structure of the trees, the tests at the internal nodes and the data stored at the leaf nodes may be learnt. The structure of a tree is the number and arrangement of the internal nodes. Training is often time consuming and computationally expensive.

Using unlabeled data for training typically means that large amounts of training data are available. That is, labeled training data is often expensive and difficult to obtain. However, using unlabeled data for training means that a training function that works for unlabeled data needs to be found. This is achieved as described in more detail below by choosing the split function which gives a larger information gain (at an internal node), where the information gain is related to the entropy of a set of unlabeled training data.

In an example, observations are accessed which are unlabeled in that each observation belongs to one of a plurality of unknown classes. A plurality of random decision trees are trained to form a density forest using the unlabeled observations such that each random decision tree partitions the unlabeled observations into a plurality of clusters each represented by a probability distribution. Each cluster may correspond to data accumulated at a leaf node. The split node tests work to partition the unlabeled observations such that the left and right partitions have more similar appearances within each partition rather than across partitions. The partitions from each of the trees may be aggregated to obtain a forest density which is a probability density function that describes the accessed observations.

Figure 6:
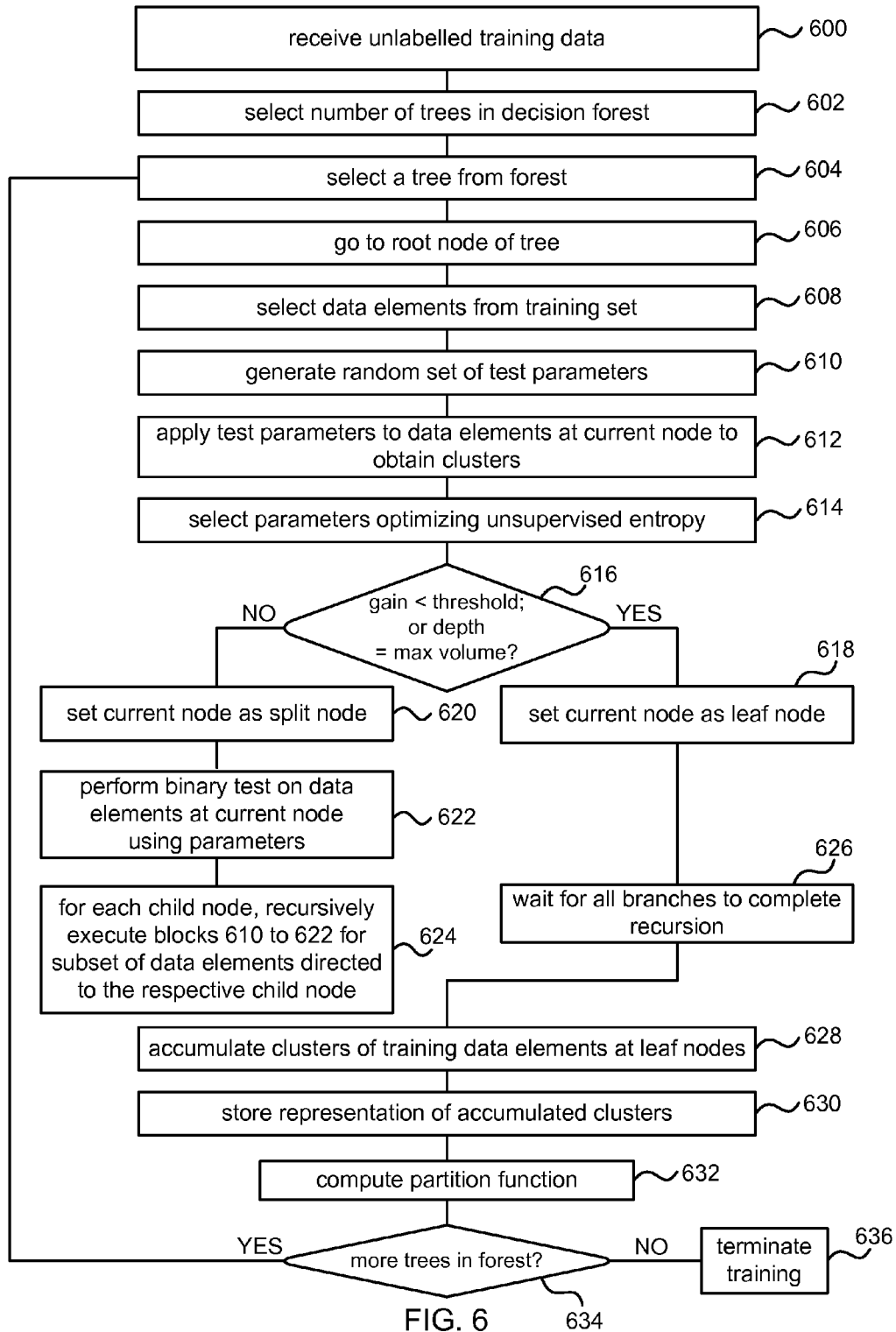
FIG. 6 is a flow diagram of a method of training a density forest.

FIG. 6 is a flow diagram of a method of training a density forest. Each individual tree in the forest may be trained independently and this training may take place in parallel. The example in FIG. 6 shows the training of each tree in series for clarity.

Unlabeled training data is received 600 and a number of trees for the decision forest is selected 602. The number of trees may be preconfigured by an operator for example. The choice of the number of trees to use depends on the application domain. In general, larger forests give higher accuracy at the expense of increased storage and computation requirements.

A tree from the forest is selected 604 and the process moves 606 to the root node of that tree. Data elements are selected 606 from the training set. For example, where the training set comprises images the data elements may be image elements of an image. A random set of test parameters 610 are generated for one or more split functions to be used at a split node. The associated split functions and parameter combinations are applied 612 to the data elements. This acts to cluster the data elements. The split function and parameter values which provided the best "split" of the training data are selected 614 and stored at the split node. In order to select the best "split" a training objective function is used which is suitable for use with unlabeled training data. For example, this may be to optimize an unsupervised information gain and a detailed example is given later in this document.

The training process may then decide whether the current node is to be set as a leaf node or not. This decision 616 may be made based on an amount of information gain associated with the unsupervised entropy at step 614. If that gain is less than a threshold then the node may be set as a leaf node 618. If the depth of the tree is at a threshold then the node may also be set as a leaf node. If there are too few samples then the node may be set as a leaf node. Otherwise the node is set as a split node 620.

Once the current node is set as a split node the split function and parameters selected at step 614 are applied to the training data elements to give a binary test 622. The process then recursively executes 624 blocks 610 to 622 for each subset of the training data elements directed to the respective child node.

When all branches of the tree have completed 626 the recursion, clusters of training elements are accumulated 628 at the leaf nodes. The training elements may be stored individually or a compact representation of the accumulated training elements may be stored at each leaf For example, a probability distribution representing the training elements accumulated at a leaf may be stored. A partition function is computed 632 using the probability density function of each leaf in the tree in order to obtain domain bounded probability densities and where the integral of the probability density is 1 as described above with reference to FIG. 4. The domain bounded probability distributions are stored associated with each leaf If there are more trees in the forest the process repeats 634; otherwise training terminates 636.

Figure 7:
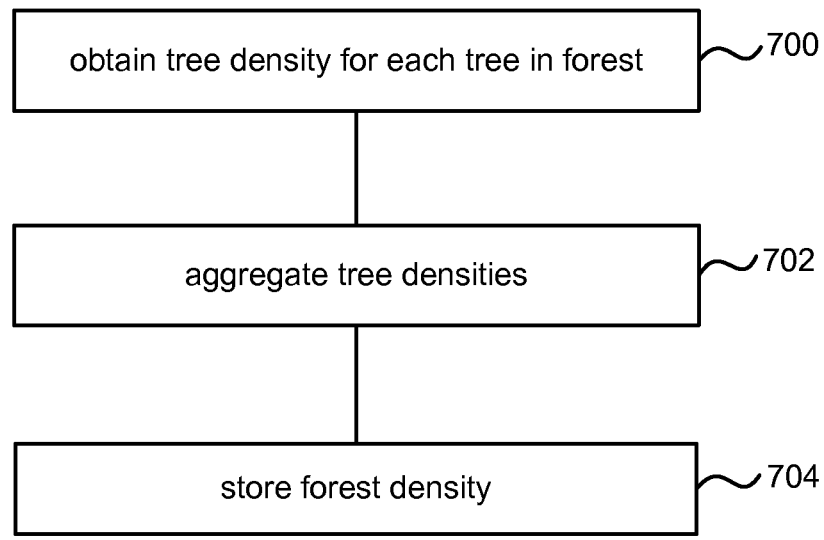
FIG. 7 is a flow diagram of a method of obtaining a forest density from a trained random decision forest.

FIG. 7 is a flow diagram of a method of obtaining a forest density from the trained random decision forest. This comprises obtaining 700, for each tree in the forest, the tree density and aggregating 702 the tree densities. Any suitable aggregation method may be used, for example, averaging. Once the forest density is obtained it may be stored 704 and used for a variety of applications. For example, to detect abnormalities in data such as medical images, credit card transactions, electronic payments, manufacturing process data, and other data. This may be achieved by training the density forest using unlabeled data observed in the application domain concerned. New observations may then be evaluated against the forest density in order to detect anomalies. In an example, medical scans of healthy individuals are used as unlabeled data to train a density forest. New medical scans are evaluated under the learned probability density function of the density forest to detect abnormalities.

In an example, given a set of unlabeled observations a computer implement system is arranged to estimate the probability density function from which such data has been generated. Each input data point v may be represented as a multi-dimensional feature response vector $v=(x1; \ldots; xd)$. The desired output is the entire probability density function p(v) where the probability density is greater than or equal to 0 and subject to the integral of the probability density function being 1.

As mentioned above a training objective function is used to train a density forest which comprises a plurality of randomly trained clustering trees. The training objective function may be one which is operable with unlabeled training data. For example, the training objective function may be, at the jth split node, to select the split function and parameters which yields the optimal information gain Ij. A working assumption that clusters of training data at the split nodes may be described using multi-variate Gaussian probability distributions may be made. In that case, the information gain Ij may be calculated as:

$$I_j = \log(|D(L_j)|) - \sum_{i \in \{L,R\}} \frac{|L_j^i|}{|L_j|} \log(|D(L_j^i)|)$$

Which can be expressed in words as: the information gain at the jth split node may be calculated as the log of: a covariance matrix of a Gaussian distribution (represented by symbol D) times the set of training points that have reached the jth split node (represented by symbol $L_j$) minus the sum over the children of the jth split node (represented by i) of the training data points that reach the children of the jth split node divided by the training data points that reach the jth split node multiplied by the log of the covariance matrix D multiplied by the training data points that reach the children of the jth split node.

As mentioned above a partition function may be calculated to make sure that the integral of the tree density is 1. As each data point reaches exactly one leaf node the following partition function may be used:

$$Z_t = \int_v \pi_{l(v)} N(v; \mu_{l(v)}, D_{l(v)}) dv$$

Which may be expressed in words as:

The partition function for tree t in a density forest is the integral over the input data points v of: a scalar $\pi_{l(v)}$ representing the proportion of all training points v that reach leaf l, multiplied by a multi-variate Gaussian distribution $N(v; \mu_{l(v)}, D_{l(v)})$ describing the cluster of training points that reach leaf l.

In order to compute the partition function approximations may be used where the tests at the split nodes are axis aligned tests. For more complex tests at the split nodes the partition function may be approximated by numerical integration.

Once a forest density is obtained it is possible to sample from the forest density in a variety of ways. Examples are described with reference to FIGS. 8, 9 and 10. This is useful in applications where it is required to generate one or more random examples from a forest density.

Figure 8:
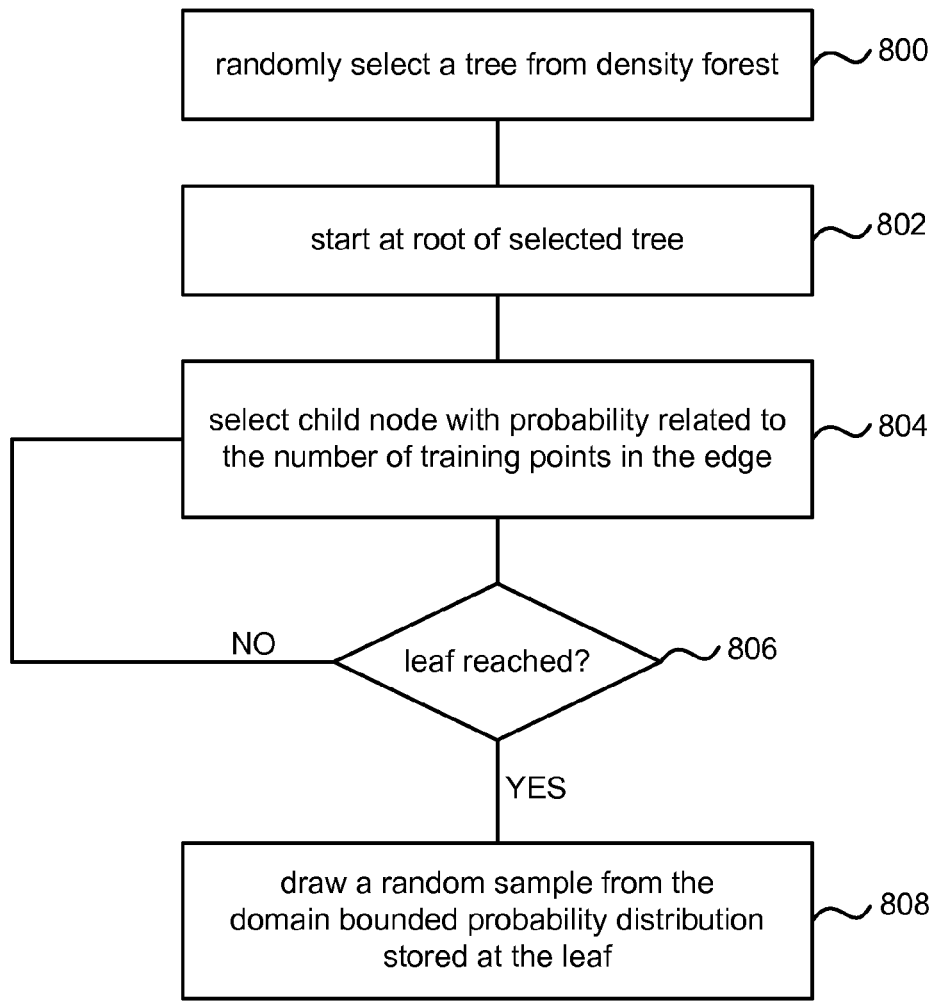
FIG. 8 is a flow diagram of a method of sampling from a density forest.

With reference to FIG. 8 a sampling engine (such as 108 of FIG. 1) randomly selects 800 a tree from a trained density forest. The sampling engine process starts 802 at a root of the selected tree. The process selects a child node of the root, the selection being made with a probability which is related to the number of training points associated with the edge between the root node and the child node. Recall that during training, a split node applies a split function to training points and according to the results of that split function some training points pass down one edge to a child node and the rest of the training points pass down the other edge to a child node (in the case of a binary tree). The number of training points associated with an edge is the number which passed down that edge during training. The process checks 806 to see if a leaf is reached. If so, a random sample is drawn from the domain bounded probability distribution stored at the leaf. Otherwise the process returns to block 804.

Figure 9:
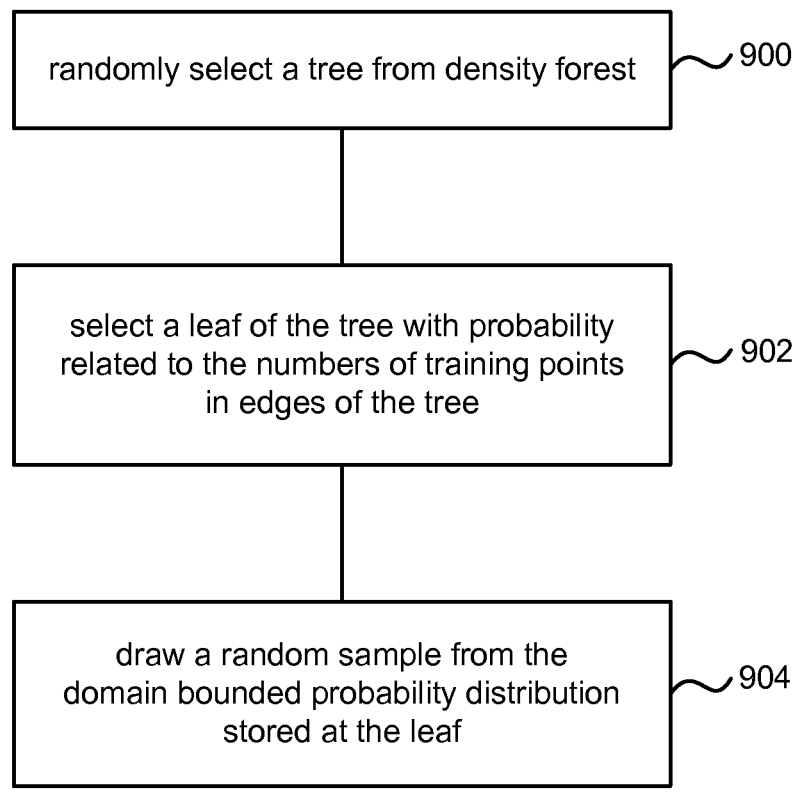
FIG. 9 is a flow diagram of another method of sampling from a density forest.

With reference to FIG. 9 a sampling engine may implement a similar process as described in FIG. 8 but with the process of moving through the split nodes collapsed. For example, by compounding all the probabilities associated with individual edges at different levels together as probabilities associated with the leaves only. Thus the tree traversal step may be replaced by direct random selection of one of the leaves. The process randomly selects 900 a tree from a density forest. A leaf of the tree is selected 902 with a probability related to the numbers of training points in edges of the tree. A random sample is drawn 904 from the domain bounded probability distribution stored at the leaf.

In some examples the density forest is used to estimate a joint forest density which is a function of two variables, x and y. The density forest may be trained so that the split functions at each split node are types of axis aligned weak learners. An axis aligned weak learner is a decision process which separates training data into two groups according to the location of the data points either side of an axis in the space that the data points are represented. Where a forest has been trained with axis-aligned weak learners then some split nodes act only on the x coordinate (namely x nodes) and others only on the y coordinate (namely y nodes).

Figure 10:
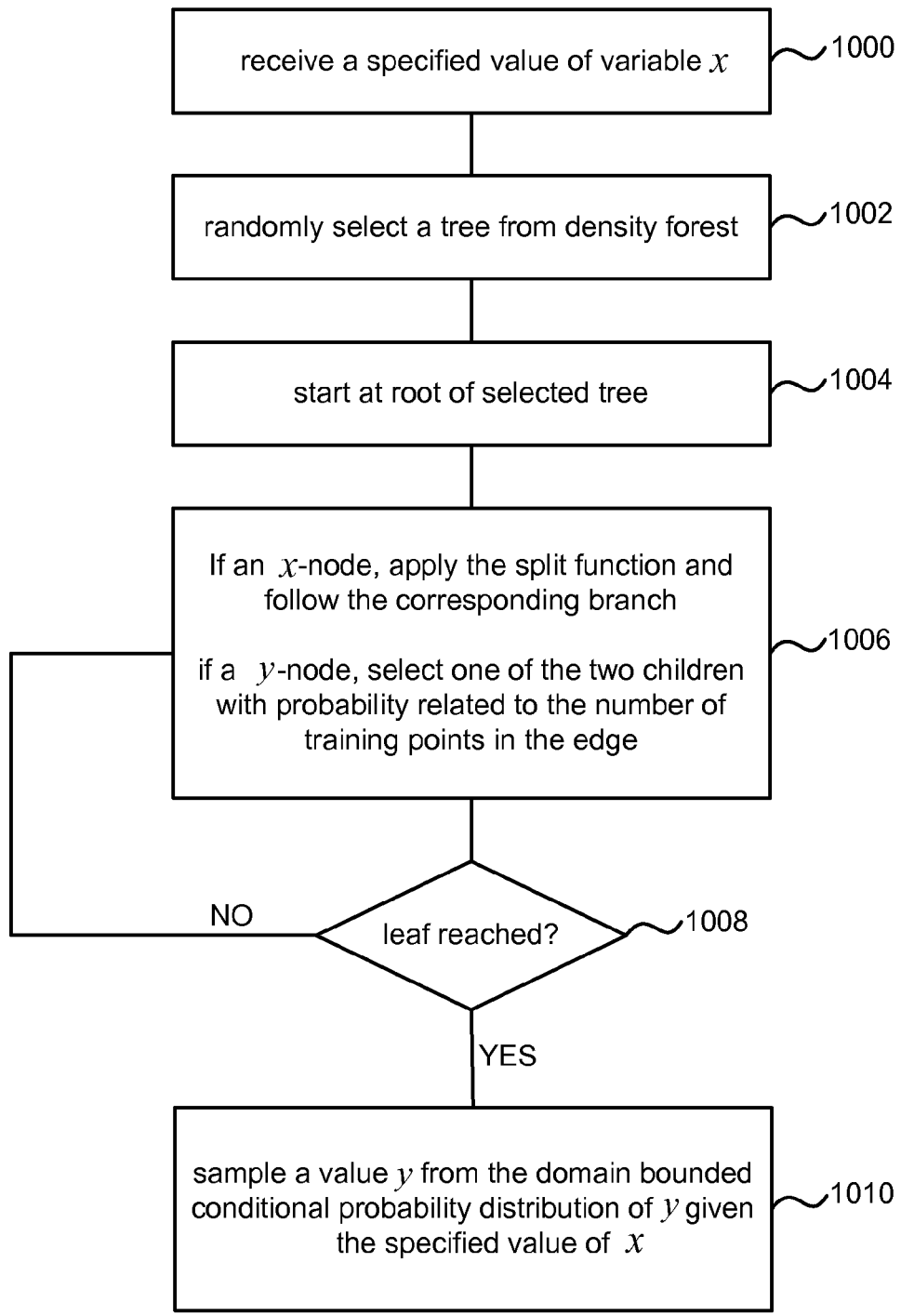
FIG. 10 is a flow diagram of a method of another method of sampling from a density forest.

The sampling engine may implement a process to sample from an estimated joint forest density, conditioned on one or more of the variables. For example, to sample from p(y|x) where x may potentially be multi-variate (i.e. a vector not a scalar), as may y. With reference to FIG. 10 a specified value of variable x is received 1000 and the process randomly selects 1002 a tree from the density forest. Starting 1004 at the root of the selected tree the process decides whether the node is an x node or a y node. If it is an x node then 1006 the split function is applied and the corresponding branch is followed. If it is a y node then the process selects one of the two children randomly, with a probability related to the number of training points in the edge. The process checks 1008 if a leaf if reached. If so, a value y is sampled 1010 from the domain bounded 1D conditional probability distribution of y given the specified value of x.

Figure 11:
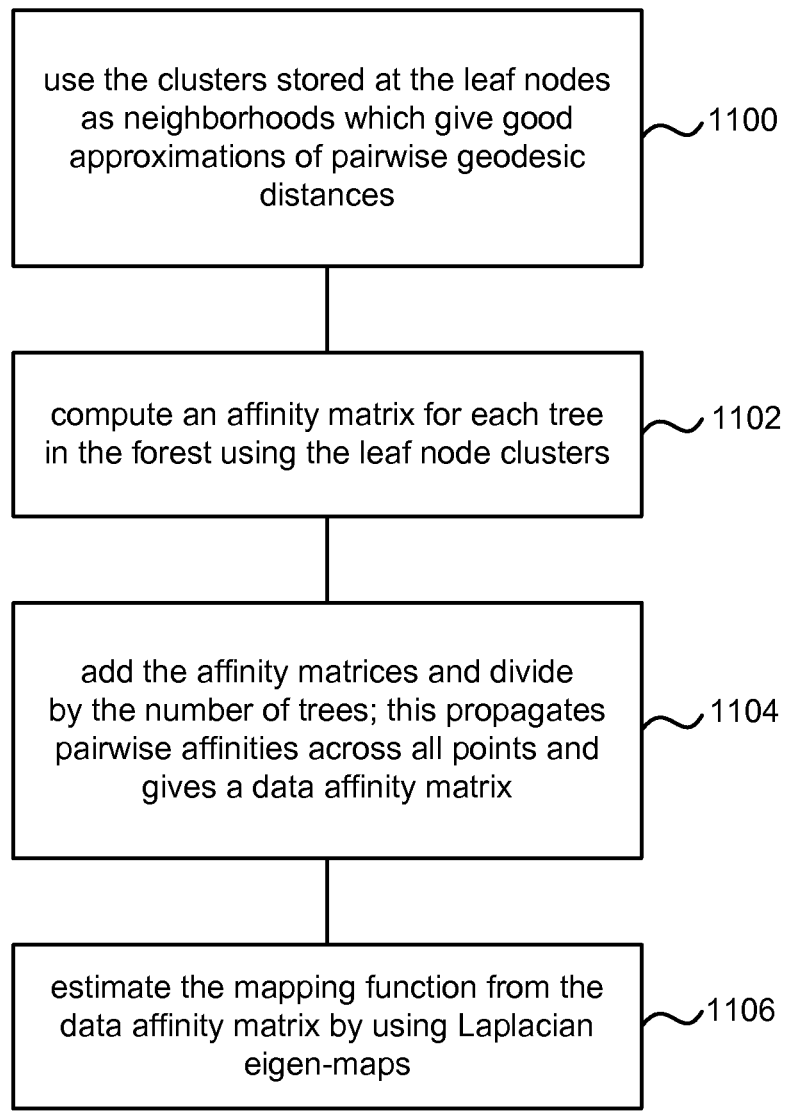
FIG. 11 is a flow diagram of a method of calculating an affinity matrix from a density forest and of calculating a mapping function from the affinity matrix.

As mentioned above the mapping engine 112 may be used to find a mapping function to map the unlabeled observations 102 to a lower dimensional space 114 whilst preserving geodesic distances and ordering of the unlabeled observations. In order to achieve this in an efficient manner, the data accumulated at the leaf nodes of the density forest (which effectively represent clusters) may be used. These clusters are used to approximate 1100 pairwise geodesic distances (see FIG. 11). For example, the distance between two points in a cluster is taken as an estimate of the geodesic distance between those two points. In another example, two points are given a distance 0 if they belong to the same cluster or 1 if not. In this case, these binary signals are smoothed out by the many trees in the forest. The mapping engine 112 computes 1102 an affinity matrix for each tree in the density forest using the leaf node clusters. An affinity matrix is an array of numbers which represents the amount of affinity (or similarity) between pairs of data points. The affinity matrices (one for each tree in the forest) are aggregated 1104, for example, by adding them and dividing by the number of trees in the forest. This aggregation process acts to propagate and smooth pairwise affinities across all training points. The result is a single, smoother data affinity matrix. The mapping engine estimates 1106 the mapping function from the data affinity matrix by using Laplacian eigen-maps as described in more detail below. Once the mapping engine has estimated the mapping function it may store the mapping function and apply that to map the unlabeled observations. In an example, the unlabeled observations in the high dimensional space are magnetic resonance images of the human brain. The result of mapping the observations to a lower dimensional space enables clustering similar images into close-by locations in the lower dimensional target space.

In an example, for each clustering tree in the density forest, a k×k points affinity matrix $W^t$ is computed with the following elements:

$$W_{i,j}{}^t = e^{-d^t(vi,vj)}$$

Where d is a distance between data points defined in any suitable manner. The distance d is taken as a local estimate of a geodesic distance between data points. For example, using a Mahalanobis affinity, using a Gaussian affinity or using a Binary affinity. These are examples only. Other types of affinity or distance measure may be used as mentioned above. The symbol t is the index of the tree in the forest, i and j are the indexes of the matrix and v represents a data point.

A binary affinity model may be parameter free and may be arranged such that given a tree t and two points vi and vj, then an optimal affinity (with value 1) is assigned to those points if they are in the same leaf cluster and null affinity otherwise.

As mentioned above the affinity matrix of each tree in the density forest may be aggregated, for example, by an averaging process so that in a forest of T trees its affinity matrix is defined as:

$$W = \frac{1}{T}\sum_{t=1}^{T} W^t$$

An example process for estimating a mapping function f from the affinity matrix is now given.

Given a graph whose nodes are the input points and the affinity matrix W a k×k normalized graph-Laplacian matrix is constructed as:

$$L = I - K^{\frac{1}{2}} W K^{\frac{1}{2}}$$

Where I is the identity matrix and $$K^{\frac{1}{2}}$$

is a normalizing diagonal matrix such that $$K_{ii} = \sum_j W_{ij}$$

The mapping function f is estimated by eigen-decomposition of L. Let the solutions of the eigen-decomposition be $e_0$, $e_1, \ldots e_{k-1}$ in increasing order of eigenvalues. The first eigenvector $e_0$ is ignored as it corresponds to a degenerate solution. The next d' eigenvectors (where d is the dimensionality of the input data space and d' is the target dimensionality of the data after the mapping, and is also less than k) are used to construct a k×d' matrix E with j indexing the eigenvectors. Mapping a point vi onto its corresponding point in the lower dimensional space is achieved by reading the ith row of the matrix E. It is not necessary to fine tune a length parameter or a neighborhood size. When using the binary affinity model the point neighborhood remains defined automatically by the forest leaves. Because only the d' bottom eigenvectors are needed and the matrix L is sparse (especially for the binary affinity model) the computation is efficient. Only one eigen-system is to be solved independent from the forest size T. Also the tree-based affinity matrices may be computed independently from one another and in parallel.

If d' is not known in advance from application specific knowledge it may be selected on the basis of the profile of the ordered eigenvalues. For example, by choosing a minimum number of eigenvalues corresponding to a sharp elbow in the profile.

In an example, a system accesses observations which are unlabeled in that each observation belongs to one of a plurality of unknown classes. The system may train a plurality of random decision trees to form a density forest using the unlabeled observations such that each random decision tree partitions the unlabeled observations into a plurality of clusters each represented by a probability distribution. The system may use the clusters to estimate geodesic distances between pairs of the unlabeled observations. Using the estimate of geodesic distances a mapping function may be generated to map the observations to a lower dimensional space whilst preserving the geodesic distances between the points. For example, silhouette images of bicycles, aeroplanes and cars in different orientations in a 150 dimensional space may be used as unlabeled observations and mapped continuously onto a two dimensional space using the methods described herein. Despite the lack of labeled training data the images are found to cluster together into three clusters, one for each of bicycles, aeroplanes and cars. In another example, news reports from the web saved as unstructured text files with no associated labels were used as training data. Each document was represented by an array of features, each feature being the occurrence of a key word in the file. The dimensionality of the space was 100 as 100 possible key words were used. The methods described herein where used to map the data to a 2D space using a binary affinity model. In the 2D space documents are clustered into topics. This is achieved automatically and without supervision.

In an example, an anomaly detection system comprises: an input arranged to access observations which are unlabeled in that each observation belongs to one of a plurality of unknown classes; a processor arranged to train a plurality of random decision trees to form a density forest using the unlabeled observations such that each random decision tree partitions the unlabeled observations into a plurality of clusters each represented by a probability distribution; the processor arranged to aggregate the partitions from each of the trees to obtain a forest density which is a probability density function that describes the accessed observations; the processor arranged to evaluate another unlabeled observation against the forest density and to detect an anomaly on the basis of the evaluation.

Figure 12:
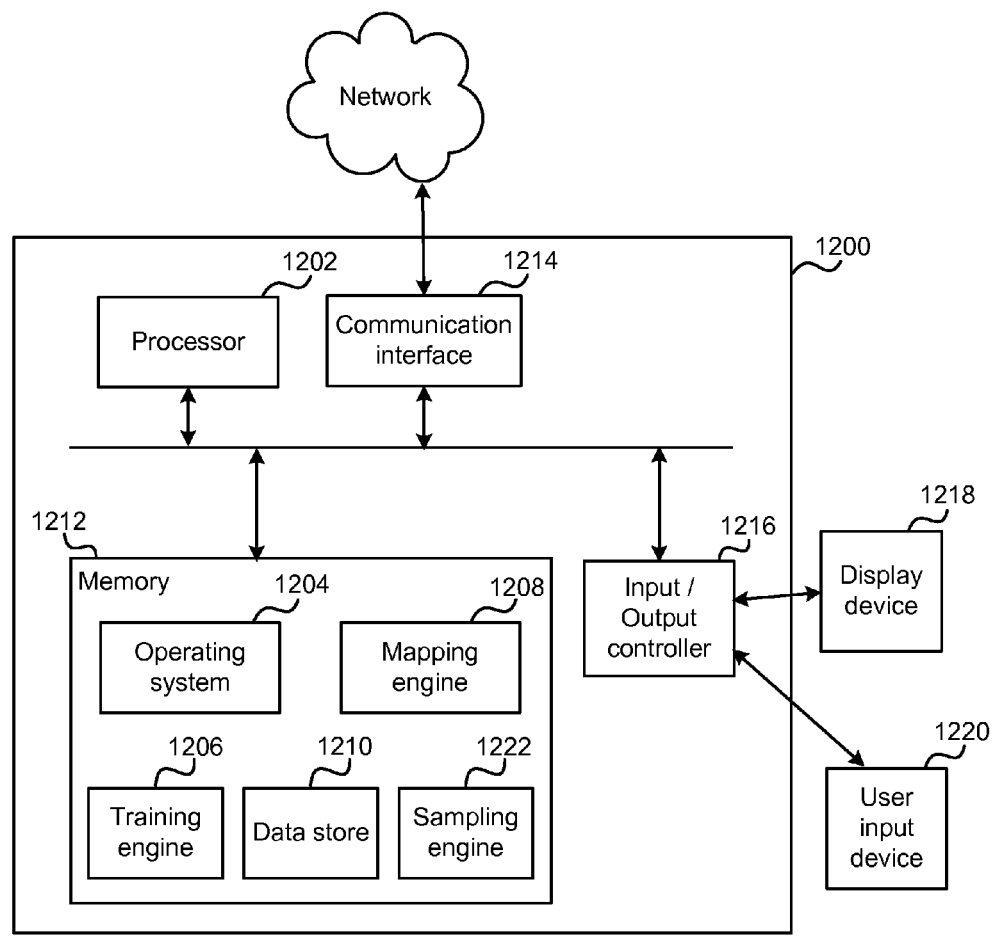
FIG. 12 illustrates an exemplary computing-based device in which embodiments of a density forest and mapping engine may be implemented.

FIG. 12 illustrates various components of an exemplary computing-based device 1200 which may be implemented as any form of a computing and/or electronic device, and in which embodiments of a density forest system may be implemented.

Computing-based device 1200 comprises one or more processors 1202 which may be microprocessors, controllers or any other suitable type of processors for processing computer executable instructions to control the operation of the device in order to train a density forest, estimate a forest density, sample from a forest density, use a density forest to map data for dimensionality reduction, and other methods described herein. In some examples, for example where a system on a chip architecture is used, the processors 1202 may include one or more fixed function blocks (also referred to as accelerators) which implement a part of the method of density forest training, or any other methods described herein in hardware (rather than software or firmware). Platform software comprising an operating system 1204 or any other suitable platform software may be provided at the computing-based device to enable application software to be executed on the device. A training engine 1206 may be provided for training a density forest and a data store 1210 for storing parameters, probability distributions, probability densities and other data. A mapping engine 1208 may be provided for mapping unlabeled observations to a lower dimensional space and for estimating a mapping function from a density forest. A sampling engine 1222 may be provided for sampling from probability density function using a density forest.

The computer executable instructions may be provided using any computer-readable media that is accessible by computing based device 1200. Computer-readable media may include, for example, computer storage media such as memory 1212 and communications media. Computer storage media, such as memory 1212, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1212) is shown within the computing-based device 1200 it will be appreciated that the storage may be distributed or located remotely and accessed via a network or other communication link (e.g. using communication interface 1214).

The computing-based device 1200 also comprises an input/output controller 1216 arranged to output display information to a display device 1218 which may be separate from or integral to the computing-based device 1200. The display information may provide a graphical user interface. The input/output controller 1216 is also arranged to receive and process input from one or more devices, such as a user input device 1220 (e.g. a mouse, keyboard, camera, microphone or other sensor). In some examples the user input device 1220 may detect voice input, user gestures or other user actions and may provide a natural user interface. This user input may be used to control the number of trees in a density forest, to adjust parameters, to select split function types, or for other purposes. In an embodiment the display device 1218 may also act as the user input device 1220 if it is a touch sensitive display device. The input/output controller 1216 may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradeable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   accessing, at a processor, observations which are unlabeled in that each observation belongs to one of a plurality of unknown classes;
   training a plurality of random decision trees to form a density forest using the unlabeled observations such that each random decision tree partitions the unlabeled observations into a plurality of clusters each represented by a probability distribution;
   aggregating the partitions from each of the trees to obtain a forest density which is a probability density function that describes the accessed observations.

2. A method as claimed in claim 1 where each random decision tree is a hierarchical tree data structure comprising split nodes and leaf nodes and having a test associated with each split node.

3. A method as claimed in claim 1 wherein training the random decision trees comprises using a training objective which applies to unlabeled training data.

4. A method as claimed in claim 1 wherein training the random decision trees comprises maximizing an unsupervised information gain.

5. A method as claimed in claim 1 wherein training the random decision trees comprises maximizing an unsupervised information gain which applies to unlabeled data.

6. A method as claimed in claim 1 comprising truncating each probability distribution by the boundaries of a partition cell associated with a leaf of a random decision tree.

7. A method as claimed in claim 1 comprising normalizing the partitions from each of the trees so that the volume of each tree density is 1 where a tree density is the probability distributions at each leaf of a random decision tree.

8. A method as claimed in claim 1 wherein aggregating the partitions comprises computing an average of a tree density of each tree where a tree density comprises the truncated, normalized probability distributions at each leaf of the tree.

9. A method as claimed in claim 1 wherein the forest density is a joint probability distribution.

10. A method as claimed in claim 1 comprising computing a sample from the forest density by using the trained random decision trees to select a probability distribution and drawing a sample from that selected probability distribution.

11. A method as claimed in claim 10 comprising selecting one of the trees and selecting a leaf node from that tree with probability related to the number of observations associated with edges of the tree during training.

12. A method as claimed in claim 2 comprising using axis-aligned tests at the split nodes and computing a sample from the forest density by using the trained random decision trees to select a probability distribution and drawing a sample from that selected probability distribution; and selecting the probability distribution by traversing one of the trees according to whether the split nodes are appropriate for a first or a second variable.

13. A method as claimed in claim 1 comprising using the clusters to estimate geodesic distances between pairs of the observations and estimating a mapping function which maps the unlabeled observations to a space of reduced dimensionality whilst preserving the estimated geodesic distances between the unlabeled observations.

14. A method as claimed in claim 13 wherein estimating the mapping function comprises computing an affinity matrix for each tree using the clusters and aggregating the affinity matrices; where an affinity matrix is an array of numbers which represents the amount of overlap between clusters.

15. A method comprising:
   accessing, at a processor, observations which are unlabeled in that each observation belongs to one of a plurality of unknown classes;
   training a plurality of random decision trees to form a density forest using the unlabeled observations such that each random decision tree partitions the unlabeled observations into a plurality of clusters each represented by a probability distribution;
   using the clusters to estimate geodesic distances between pairs of the unlabeled observations.

16. A method as claimed in claim 15 comprising calculating a mapping function to map the accessed observations to a lower dimensional space whilst preserving the estimated geodesic distances.

17. A method as claimed in claim 16 comprising computing an affinity matrix for each tree which represents a degree of overlap between the clusters and aggregating the affinity matrices.

18. An anomaly detection system comprising:
   an input arranged to access observations which are unlabeled in that each observation belongs to one of a plurality of unknown classes;
   a processor arranged to train a plurality of random decision trees to form a density forest using the unlabeled observations such that each random decision tree partitions the unlabeled observations into a plurality of clusters each represented by a probability distribution;
   the processor arranged to aggregate the partitions from each of the trees to obtain a forest density which is a probability density function that describes the accessed observations;
   the processor arranged to evaluate another unlabeled observation against the forest density and to detect an anomaly on the basis of the evaluation.

19. A system as claimed in claim 18 wherein the observations are medical images from healthy subjects.

20. A system as claimed in claim 18 wherein the processor is arranged to train the random decision trees using a training objective which applies to unlabeled training data.

* * * * *